(12) United States Patent
Matsuoka

(10) Patent No.: US 8,342,761 B2
(45) Date of Patent: Jan. 1, 2013

(54) COATING/DEVELOPING APPARATUS AND COATING/DEVELOPING METHOD

(75) Inventor: Nobuaki Matsuoka, Kumamoto (JP)

(73) Assignee: Tokyo Electron Limited, Tokyo (JP)

(*) Notice: Subject to any disclaimer, the term of this patent is extended or adjusted under 35 U.S.C. 154(b) by 233 days.

(21) Appl. No.: 12/859,559

(22) Filed: Aug. 19, 2010

(65) Prior Publication Data
US 2011/0043773 A1 Feb. 24, 2011

(30) Foreign Application Priority Data
Aug. 24, 2009 (JP) .................. 2009-193387

(51) Int. Cl.
*G03D 5/00* (2006.01)
(52) U.S. Cl. .......... 396/611; 118/506; 438/800
(58) Field of Classification Search ............ 396/611; 700/112; 118/506; 438/800
See application file for complete search history.

(56) References Cited

U.S. PATENT DOCUMENTS

| | | | |
|---|---|---|---|
| 6,187,132 B1* | 2/2001 | Iwasaki et al. | 156/345.54 |
| 7,871,265 B2* | 1/2011 | Fukuoka et al. | 432/81 |
| 2007/0218706 A1* | 9/2007 | Matsuoka | 438/781 |
| 2008/0269937 A1* | 10/2008 | Yamamoto | 700/112 |

FOREIGN PATENT DOCUMENTS

| | | |
|---|---|---|
| JP | 63-226928 A | 9/1988 |
| JP | 04-085812 A | 3/1992 |
| JP | 07-221162 A | 8/1995 |
| JP | 2001-077020 A | 3/2001 |
| JP | 2003-7795 A | 1/2003 |
| JP | 2003-332230 A | 11/2003 |
| JP | 2008-147320 A | 6/2008 |
| WO | 2009101869 A | 8/2009 |

OTHER PUBLICATIONS

An Office Action dated Dec. 26, 2011, issued from the Japanese Patent Office (JPO) of Japanese Patent Application No. 2009-193387 and a partial English translation thereof.

* cited by examiner

*Primary Examiner* — Christopher Mahoney
(74) *Attorney, Agent, or Firm* — Ableman, Frayne & Schwab

(57) ABSTRACT

Disclosed is an coating/developing apparatus and method thereof in which the processing time is shortened and the foot prints is reduced by shortening the travel distance of a wafer transfer arm. The coating/developing apparatus of the present disclosure includes, inter alia, liquid processing part (COT) that processes the substrate using a liquid, a cooling processing part (CA) provided to correspond to the liquid processing part (COT) and perform the cooling process for the substrate, a liquid processing unit (COTU) provided to correspond to the cooling processing part (CA) and equipped with a heating processing part (HP) that performs a heating processing for the substrate. The cooling processing part (CA) transfers the substrate to/from the liquid processing part (COT) and the heating processing part (HP).

13 Claims, 9 Drawing Sheets

COATING/DEVELOPING APPARATUS AND COATING/DEVELOPING METHOD This application is based on and claims priority from Japanese Patent Application No. 2009-193387, filed on Aug. 24, 2009, with the Japanese Patent Office, the disclosure of which is incorporated herein in its entirety by reference.

TECHNICAL FIELD

The present disclosure relates to a coating/developing apparatus and a coating/developing method that processes a substrate using a chemical liquid.

BACKGROUND

In a photolithography process of a semiconductor device fabrication process, a fine resist pattern is formed by performing processes such as a hydrophobic conversion process for the surface of a semiconductor wafer (hereinafter "a substrate" or "wafer") first, and then, a coating and heating process of BARC (Bottom Anti-Reflective Coating), an exposing process, and then an developing process of a solubilization portion and removing the same.

Prior to the exposing process of the resist pattern, a series of processes are continuously performed including a coating process of BARC, a heating process (a pre-baking) to evaporate the solvent inside the applied BARC, a cooling process, a resist coating process that applies a resist to a cooled wafer, and a heating process (a pre-baking) to evaporate the solvent inside the applied resist solution. Also, after the exposing process of the resist pattern, a series of processes are performed including a heating process (a pre-baking after the exposure process), a cooling process, and an exposure process that applies an exposure solution to a cooled wafer to expose the wafer.

Recently, the foot prints of the entire coating/developing apparatus that performs a coating and developing processes of a semiconductor wafer has been increased as the wafer size becomes larger (e.g. 450 mm).

Moreover, the processing capability of wafers per unit time may be increased for a cost saving, and for this reason, multiple processing units are included in a coating/developing apparatus thereby further increasing the foot prints of the entire apparatus.

Japanese Laid-Open 2003-7795 shows an exemplary coating/developing apparatus where each processing unit is placed on both sides from the cassette side toward the exposure apparatus, and a common wafer transfer arm is provided at the center.

SUMMARY

According to an aspect of the present disclosure, a coating/developing apparatus is provided and includes a carrier block configured to receive a substrate carried by a carrier, a liquid process unit that processes the substrate transferred from the carrier block, an interface block configured to transfer the substrate to/from a secondary processing unit. The liquid process unit includes a liquid process part configured to apply a coating layer including a resist layer on the substrate, a cooling process part configured to correspond to the liquid process part and cool the substrate formed with the coating layer, a heating process part configured to correspond to the cooling process part and heat the substrate formed with the coating layer. In particular, the cooling process part is further configured to transfer the substrate to/from each of the liquid process part and the heating process part.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
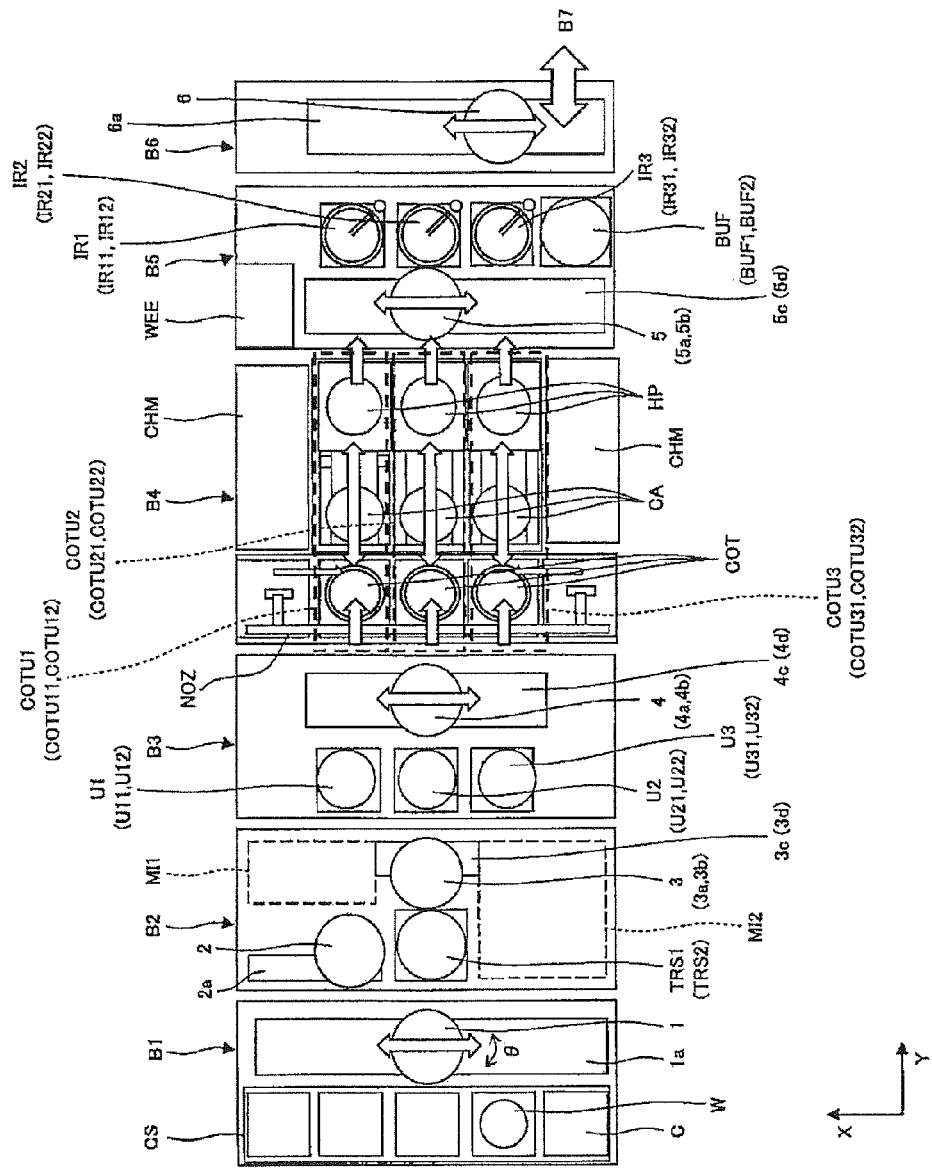
FIG. 1 is a schematic plan view illustrating the constitution of the coating/developing apparatus, according to an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

The conventional coating/developing apparatus as described above has following problems. For example, when a common wafer transfer arm is provided at the center, the number of wafer transfer is increased between the processing units arranged on both sides with multiple layers of an upper/lower side. As a result, the processing time is increased and the number of wafers that can be processed per unit time may not be increased.

Moreover, since there is only one wafer transfer arm at the center, and each unit configured to process a specific wafer may not be readily integrated, the foot prints may not be reduced.

The present disclosure addresses the above problems and provides a coating/developing apparatus and method thereof in which the travel distance of the wafer transfer arm is shortened thereby reducing the processing time and foot prints.

In order to resolve the aforementioned problems, the present disclosure provides the following measures.

According to an aspect of the present disclosure, a coating/developing apparatus is provided and includes a carrier block configured to receive a substrate carried by a carrier, a liquid process unit that processes the substrate transferred from the carrier block, an interface block configured to transfer the substrate to/from a secondary processing unit. The liquid process unit includes a liquid process part configured to apply a coating layer including a resist layer on the substrate, a cooling process part configured to correspond to the liquid process part and cool the substrate formed with the coating layer, a heating process part configured to correspond to the cooling process part and heat the substrate formed with the coating layer. In particular, the cooling process part is further configured to transfer the substrate to/from each of the liquid process part and the heating process part.

In particular, the cooling process part is adjacent to the liquid process part and the heating process part is adjacent to the cooling process part, and the liquid process part, the cooling process part and the heat process part are arranged along a straight line. Also, the coating/developing apparatus includes a plurality of the liquid process units, the plurality of the liquid process units are placed in parallel within the same plane, and the plurality of the liquid process units are placed by overlapping with an up and down direction. The heating process part includes a plurality of heating plates configured to hold the substrate and perform a heating process, and the plurality of heating plates are placed by overlapping with an up and down direction.

The cooling process part includes a cooling plate configured to hold the substrate and perform a cooling process, and the cooling plate is further configured to transfer the substrate to/from the liquid process part and the heating process part. Also, the cooling process part includes a cooling plate configured to hold and perform the cooling process of the substrate and a holding plate, the cooling plate is configured to transfer the substrate to/from the heating process part, and the holding plate is configured to transfer the substrate to/from the liquid process part. In particular, the cooling plate is provided with a capability of moving in a direction where the liquid process part, the cooling process part and the heating process part of the liquid process unit are arranged, as well as an up and down direction.

Moreover, the liquid process unit includes a chemical liquid supply part that converts and supplies one of a plurality of chemical liquids to the liquid process part, and the chemical liquid supply part includes a plurality of nozzles provided corresponding to the plurality of chemical liquids. Also, the coating/developing apparatus includes a pre-process unit provided to correspond to the liquid process unit and configured to perform a pre-processing for the substrate to be processed by the liquid process unit. And, the coating/developing apparatus includes a post-process unit provided to correspond to the liquid process unit and configured to perform a post-processing for the substrate processed by the liquid process unit.

The coating/developing apparatus includes a first buffer unit configured to transfer the substrate between a carry-in/carry-out unit that carry-in/carry-out the substrate to the liquid process unit and the carry-in/carry-out unit side of the liquid process unit. Also, the coating/developing apparatus includes a second buffer unit configured to transfer the substrate between the liquid process unit and an opposite side of the carry-in/carry-out unit of the liquid process unit. The liquid process part performs a coating process of a chemical liquid to the substrate, and the liquid process part performs a developing process for the substrate using a developing liquid.

According to another aspect of the present disclosure, a coating/developing method is disclosed utilizing a coating/developing apparatus that includes a liquid process unit which comprises a liquid process part configured to apply a coating layer including a resist layer on the substrate, a cooling process part configured cool the substrate formed with the coating layer, and a heating process part configured to heat the substrate formed with the coating layer. The method includes transferring the substrate carried into a carrier block by a carrier to the liquid process unit, processing the substrate using a chemical liquid by the liquid process unit, cooling the substrate by the cooling process part provided to correspond to the liquid process part, heating the substrate by the heating process part provided to correspond to the cooling process part, and transferring the substrate by the cooling process part to/from the liquid process part and the heating process part.

In particular, the coating/developing method further includes placing the cooling process part adjacent to the liquid process part, and placing the heating process part adjacent to the cooling process part. The coating/developing method also includes arranging the liquid process part, the cooling process part and the heating process part along a straight line. Also, the coating/developing method further includes providing a plurality of the liquid process units each equipped with the liquid process part, the cooling process part, and the heating process part. Additionally, the coating/developing method also includes placing the plurality of liquid process units in parallel within the same plane, and placing the plurality of the liquid process units by overlapping with an up and down direction.

According to the coating/developing apparatus of the present disclosure, the travel distance of the wafer transfer arm is shortened thereby reducing the processing time and the foot prints.

Exemplary Embodiment

Hereinafter, descriptions will be made for an exemplary embodiment with reference to the drawings. Referring to FIGS. 1 through 7, a coating/developing apparatus will be described according to an embodiment.

Figure 2:
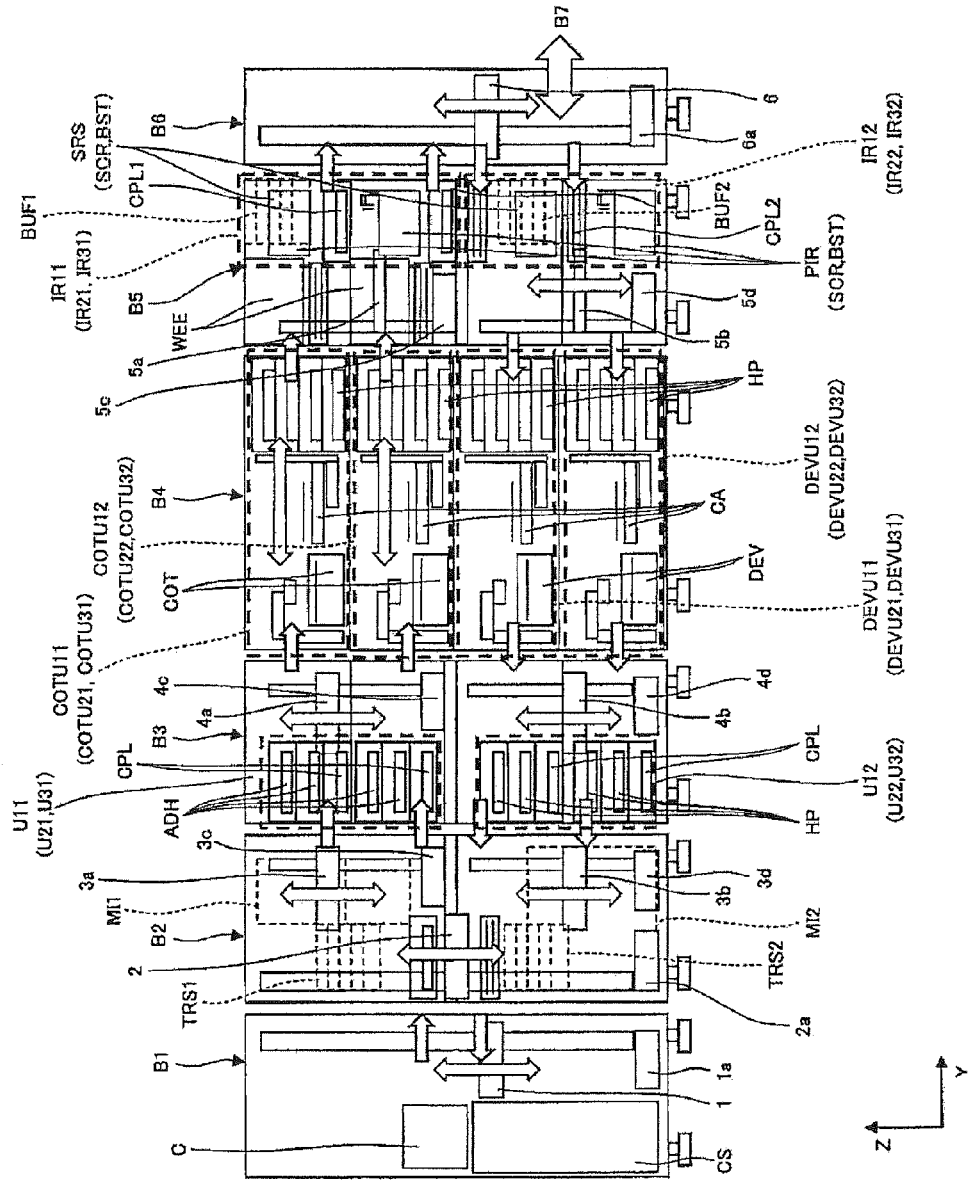
FIG. 2 is a schematic front view illustrating the constitution of the coating/developing apparatus, according to an embodiment.

Referring to FIGS. 1 and 2, the coating/developing apparatus of the present embodiment includes a carrier block B1, a test block B2, a hydrophobic conversion/heat process block B3, a coating/developing process block B4, a rinse cleaning block B5, and an interface block B6. These blocks are arranged side by side according to the described order, and interface block B6 is connected to an exposure apparatus (not shown).

Carrier block B1 includes a cassette arrangement plate CS and a wafer transfer arm 1. Cassette arrangement plate CS is configured such that multiple cassettes C can be placed in a line along the horizontal X direction on a predetermined position.

Wafer transfer arm 1 is provided to be moveable along the X direction on the transfer path 1a. Wafer transfer arm 1 is also moveable along the direction where the wafers W received at a cassette C are arranged (e.g., the Z direction or a vertical direction), and constituted to selectively access the wafers W in the cassette arranged in the X direction. Wafer transfer arm 1 is configured to rotate in θ direction along the Z axis, and to access the buffer cassette of test block B2 as well which will be described later.

Also, cassette arrangement plate CS of carrier block B1 corresponds to the carry-in/carry-out unit of the present disclosure.

Test block B2 includes, for example, two test units MI1, MI2, two transfer units TRS1, TRS2 and two wafer transfer arm 2, 3.

Two test units MI1, MI2 measure the thickness of the film or the line width of the pattern formed on a wafer W. Test units MI1, MI2 may be built with, for example, an Optical Digital Profilometry (ODP) system equipped with a scatterometry. Alternatively, test units MI1, MI2 may be equipped with a macroscopic test unit that detects macroscopic defects on the wafer W. Or, test block B2 may be equipped with an overlap test unit that detects the overlap dislocation of an exposure, that is, the positional overlap between the formed pattern and an underlying pattern.

Two transfer units TRS1, TRS2 are provided to be overlapped in an up/down direction, and transfer the wafer between the wafer transfer arm 1 of carrier block B1.

Wafer transfer arm 2 is provided to be moveable along the X direction on transfer path 2a. Wafer transfer arm 2 is also configured to be moveable along the arrangement direction of the wafer (e.g., the Z direction or a vertical direction) accommodated in transfer units TRS1, TRS2, and to selectively access the wafer W inside transfer units TRS1, TRS2 provided to be overlapped in an up/down direction. Wafer transfer arm 2 transfers the wafer W between transfer units TRS1, TRS2 and test unit MI1.

Wafer transfer arm 3 is formed with, for example, wafer transfer arms 3a, 3b placed to be overlapped at the upper end and lower end. Wafer transfer arm 3a of the upper end is provided corresponding to transfer unit TRS1 and the upper end of hydrophobic conversion/heat processing block B3 which will be described later. Wafer transfer arm 3b of the lower end is provided corresponding to transfer unit TRS2 and the lower end of hydrophobic conversion/heat processing block B3.

Wafer transfer arm 3a is provided to be moveable along the X direction on transfer path 3c. Wafer transfer arm 3a is also moveable along the arrangement direction of the wafer W (e.g., the Z direction or a vertical direction) accommodated in transfer unit TRS1, and to selectively access the wafer W inside transfer unit TRS1 provided to be overlapped in an up/down direction. Wafer transfer arm 3a transfers the wafer W between test unit MI1 and the upper end of hydrophobic conversion/heat processing block B3 which will be described later.

Wafer transfer arm 3b is provided to be moveable along the X direction on transfer path 3d. Wafer transfer arm 3b is also moveable along the arrangement direction of the wafer W (e.g., the Z direction or a vertical direction) accommodated in transfer unit TRS2, and to selectively access the wafer W inside transfer unit TRS2 provided to be overlapped in an up/down direction. Wafer transfer arm 3a transfers the wafer W between test unit MI2 and the upper end of hydrophobic conversion/heat processing block B3 which will be described later.

Hydrophobic conversion/heat processing block B3 includes shelf units U1~U3 and transfer arm 4. Shelf units U1, U2, U3 are provided corresponding to coating processing units COTU1, COTU2, COTU3, and perform a hydrophobic processing or heat processing for the substrate to be processed by the coating processing units.

Also, the hydrophobic conversion processing and the heat processing performed at hydrophobic conversion/heat processing block B3 each corresponds to a pre-processing and a post-processing of the present disclosure, respectively.

Shelf unit U1 is formed with, for example, shelf units U11, U12 placed to be overlapped in an up/down direction with two layers. Likewise, each of shelf units U2, U3 is formed with shelf unit set U21, U22 and shelf unit set U31, U32, respectively, placed to be overlapped in an up/down direction with two layers.

Shelf units U11, U21, U31 of the upper end are provided with, for example, four hydrophobic conversion units ADH and two cooling process units CPL to be overlapped in an up/down direction. As illustrated in FIG. 2, two hydrophobic conversion process units ADH, one cooling process unit CPL, two hydrophobic conversion processing units ADH, and one cooling process unit CPL are sequentially placed from the top.

Shelf units U12, U22, U32 of the lower end are provided, for example, with four heating process unit HP, and two cooling process unit CPL to be overlapped in up/down direction so that a heating process is performed for the wafer W on which a developing process is performed at a developing process unit DEV of coating/developing process block B4. As illustrated in FIG. 2, two heating process units HP, one cooling process unit CPL, two heating process units HP and one cooling process unit CPL are sequentially placed from the top.

Wafer transfer arm 4 is formed with, for example, wafer transfer arms 4a, 4b placed to be overlapped at the upper end and lower end. Wafer transfer arm 4a of the upper end is provided corresponding to shelf units U11, U21, U31 of the upper end. Wafer transfer arm 4b of the lower end is provided corresponding to shelf units U12, U22, U32 of the lower end.

Wafer transfer arm 4a is provided to be moveable along the X direction on transfer path 4c. Wafer transfer arm 4a is also moveable along the Z direction (e.g., a vertical direction), and can selectively access the wafers W in each processing unit of shelf units U11, U21, U31. Wafer transfer arm 4a transfers the wafer W between shelf units U11, U21, U31 and coating process units COTU1~COTU3 of coating/developing process block B4 which will be described later.

Wafer transfer arm 4b is provided to be moveable along the X direction on transfer path 4d. Wafer transfer arm 4b is also moveable along the Z direction (e.g. a vertical direction), and configured to selectively access the wafer W inside each processing unit of shelf units U12, U22, U32. Wafer transfer arm 4b transfers the wafer W between shelf units U12, U22, U32 and developing process unit DEV of developing process units DEVU1, DEVU2, DEVU3 of coating/developing process block B4 which will be described later.

Coating/developing process block B4 includes, for example, coating process units COTU1~COTU3 and developing process units DEVU1~DEVU3. The coating process unit and developing process unit are provided to be overlapped with a two layer in an up/down direction, and, for example, the coating process unit is provided at the upper end and the developing process unit is provided at the lower end.

Coating process unit COTU1 is formed with, for example, coating process units COTU11, COTU12 to be overlapped in an up/down direction with two layers. Likewise, each of coating process units COTU2, COTU3 is formed with coating process unit set COTU21, COTU22 and developing process unit set COTU31, COTU32, respectively.

Developing process unit DEVU1 is also formed with, for example, developing process units DEVU11, DEVU12 provided to be overlapped in an up/down direction with two layers. Likewise, each of developing process units DEVU2, DEVU3 is formed with developing process unit set DEVU21, DEVU22 and developing process unit set DEVU31, DEVU32, respectively, provided to be overlapped in an up/down direction with two layers.

Next, the constitution of coating process units COTU11 will be described as coating process units COTU11~COTU32. Also, coating process units COTU12, COTU21, COTU22, COTU31, COTU32 can have similar constitution to coating process unit COTU11.

Coating process unit COTU11 includes coating process part COT, cooling process part CA and heating process part HP as well as a chemical liquid supply part NOZ that supplies a chemical liquid to coating process part COT. Cooling process part CA is provided corresponding to coating process part COT by 1:1. Since heating process part HP is provided corresponding to cooling process part CA by 1:1, heating process part HP is also provided corresponding to coating process part COT by 1:1. Coating process part COT, cooling process part CA and heating process part HP are all aligned sequentially in a straight line along the Y direction in a horizontal plane.

The coating process unit according to the present embodiment is an exemplary embodiment of the liquid process unit of the present disclosure. Also, the coating process part of the present embodiment corresponds to the liquid process part and liquid process means of the present disclosure. Moreover, the cooling process part of the present embodiment corresponds to the cooling process part and cooling process means of the present disclosure. Also, the heating process part of the present embodiment corresponds to the heating process part and heating process means of the present disclosure.

Each of coating process part COT, cooling process part CA and heating process part HP may not be aligned in a straight line, as long as heating process part HP is adjacent to cooling process part CA, and cooling process part CA is adjacent to coating process part COT.

As will be described later, cooling process part CA has a wafer transfer function to/from coating process part COT and heating process part HP. Specifically, cooling process part CA includes a cooling pin that supports the substrate and performs a cooling process. The cooling pin will be described later. The cooling pin is configured to be moveable along the Y and Z directions. Cooling process part CA transfers the wafer W to/from coating process part COT and heating process part HP using the cooling pin.

A chemical room CHM may be provided in coating/developing process block B4 to supply various chemicals to each coating process unit of coating/developing process block B4 at the front and inner sides of the +X or −X direction viewed from the plane, or at the empty space of the upper and lower sides of the Z direction. Instead of chemical room CHM, an electric switching room may be provided including an electric control circuit.

Rinse cleaning block B5 includes a peripheral exposure apparatus WEE, wafer transfer arm 5, rinse cleaning unit IR1~IR3 and buffer unit BUF.

Peripheral exposure apparatus WEE exposes the periphery of the wafer on which a chemical liquid is applied at coating process unit COTU.

Wafer transfer arm 5 is formed with, for example, wafer transfer arms 5a, 5b provided to be overlapped at the upper and lower ends.

Wafer transfer arm 5a of the upper end is provided corresponding to coating process units COTU1~COTU3 of coating/developing process block B4. Wafer transfer arm 5b of the lower end is provided corresponding to developing process units DEVU1~DEVU3 of coating/developing process block B4. Wafer transfer arm 5a of the upper end is configured to be moveable along the X direction on transfer path 5c, and transfers wafer W between heating process part HP of coating process units COTU1, COTU2, COTU3, rinse cleaning units IR11~IR31 of rinse cleaning block B5 (which will be described later), and buffer unit BUF1. Wafer transfer arm 5b of the lower end is configured to be moveable along the X direction on transfer path 5d, and transfers wafer W between heating process part HP of developing process units DEVU1~DEVU3, rinse cleaning units IR21~IR32 (which will be described later) of rinse cleaning block B5, and buffer unit BUF2.

Rinse cleaning unit IR1 is formed with, for example, rinse cleaning units IR11, IR12 provided to be overlapped in an up/down direction with two layers. Likewise, each of rinse cleaning units IR2, IR3 is formed with the set of rinse cleaning units IR21, IR22, and the set of rinse cleaning units IR31, IR32. Each of the sets is provided to be overlapped in an up/down direction with two layers. Also, each of rinse cleaning units IR11~IR32 is formed with, for example, a spin cleaning unit SRS and an immersion cleaning unit PIR, provided to be overlapped in an up/down direction with two layers. A scrubber SCR or a backside scrubber BST may be placed instead of some spin cleaning unit SRS and immersion cleaning unit PIR.

Rinse cleaning units IR11, IR21, IR31 perform a pre/post cleaning process for a wafer W before/after an exposure operation is performed at periphery exposure apparatus WEE, as well as a pre-cleaning process for the wafer W performed prior to the exposure process at periphery exposure apparatus WEE. Rinse cleaning units IR12, IR22, IR32 perform a post cleaning process after the exposure process at periphery exposure apparatus WEE.

The cleaning process performed before the exposure process at rinse cleaning block B5 corresponds to a post-process, and the cleaning process performed after the exposure process at rinse cleaning block B5 corresponds to a pre-process of the present disclosure.

Buffer unit BUF is formed with, for example, buffer units BUF1, BUF2 provided to be overlapped at the upper end and the lower end. Buffer unit BUF1 of the upper end is a carry-in buffer unit that accommodates the wafer W carried in to periphery exposure apparatus WEE and exposure apparatus B7 (not shown). Buffer unit BUF 2 of the lower end is a carry-out buffer unit that temporarily accommodates the wafer W taken out from exposure apparatus B7. Also, each of cooling process units CPL1, CPL2 is arranged to buffer units BUF1, BUF2, respectively, to be overlapped in an up/down direction.

Interface block B6 includes wafer transfer arm 6 configured to be moveable along the X direction on transfer path 6a. Wafer transfer arm 6 is configured to be moveable along the Z direction (e.g., a vertical direction) as well and to selectively access the wafer W in rinse cleaning units IR1~IR3 of rinse cleaning block B5 and buffer units BUF1, BUF2. Wafer transfer arm 6 transfers the wafer W where the pre-exposure cleaning process is performed from buffer unit BUF1 to exposure apparatus B7 (not shown), and transfers the wafer where the exposure process is performed from exposure apparatus B7 to buffer unit BUF2.

Next, description will be made for the flow of the wafer W in the coating/developing apparatus. Cassette C is introduced into cassette arrangement plate CS from outside, and the wafer is taken out from cassette C by wafer transfer arm 1. The wafer W is then transferred from wafer transfer arm 1 to wafer transfer unit TRS1, and further transferred to test unit MI1 where a tested is performed. Upon completing the test, the wafer W is transferred to hydrophobic conversion process unit ADH by transfer arm 3a where a hydrophobic conversion process is performed, and then transferred to coating process unit COTU by wafer transfer arm 4a. The wafer W is then processed by coating process part COT, cooling process part CA and heating process part HP. The wafer W is then transferred to cooling unit CPL1 by wafer transfer arm 5a where a cooling process is performed. Once the cooling process is performed, the wafer W is transferred to spin cleaning unit SRS by wafer transfer arm 5a for a cleaning process, and then transferred to periphery exposure apparatus WEE where the periphery exposure is performed. Subsequently, the wafer W is transferred to one of rinse cleaning units IR11, IR21, IR31 by wafer transfer arm 5a, and a pre-exposure cleaning process is performed. The wafer W is then transferred to exposure apparatus B7 (not shown) by wafer transfer arm 6 of interface block B6 and an exposure process is performed.

Upon completing the exposure process, the wafer W is transferred to one of rinse cleaning units IR12, IR22, IR32 by wafer transfer arm 6 and a cleaning process is performed after the exposure process. The wafer W is then transferred to developing process unit DEVU by wafer transfer arm 5b. The wafer W is then processed in each of heating process unit HP, cooling process unit CA and developing process DEV. The wafer W is then transferred to heating process unit HP by wafer transfer arm 4b and a heating process is performed. Upon completing the heating process, the wafer W is transferred to test unit MI1 by wafer transfer arm 3b where a test is conducted. After the test is conducted, the wafer W is transferred to transfer unit TRS2 by wafer transfer arm 2, and returned to cassette by wafer transfer arm 1.

In particular, each of the processes at coating process unit COTU and developing process unit DEVU may be performed in parallel using multiple coating process units COTU and developing process units DEVU.

That is, according to the coating/developing apparatus of the present embodiment, the substrate introduced into carrier block B1 by the carrier [cassette C] is transferred to the process part [coating process part COT, cooling process part CA and heating process part HP] where a coating layer including a resist layer is formed. Upon forming the coating layer, the substrate is transferred to an exposure apparatus via interface block B6, and the exposed substrate is returned to the process unit [developing process part DEV, cooling process part CA and heating process part HP] where the exposed substrate is developed. The substrate is then transferred to carrier block B1.

Figure 3:
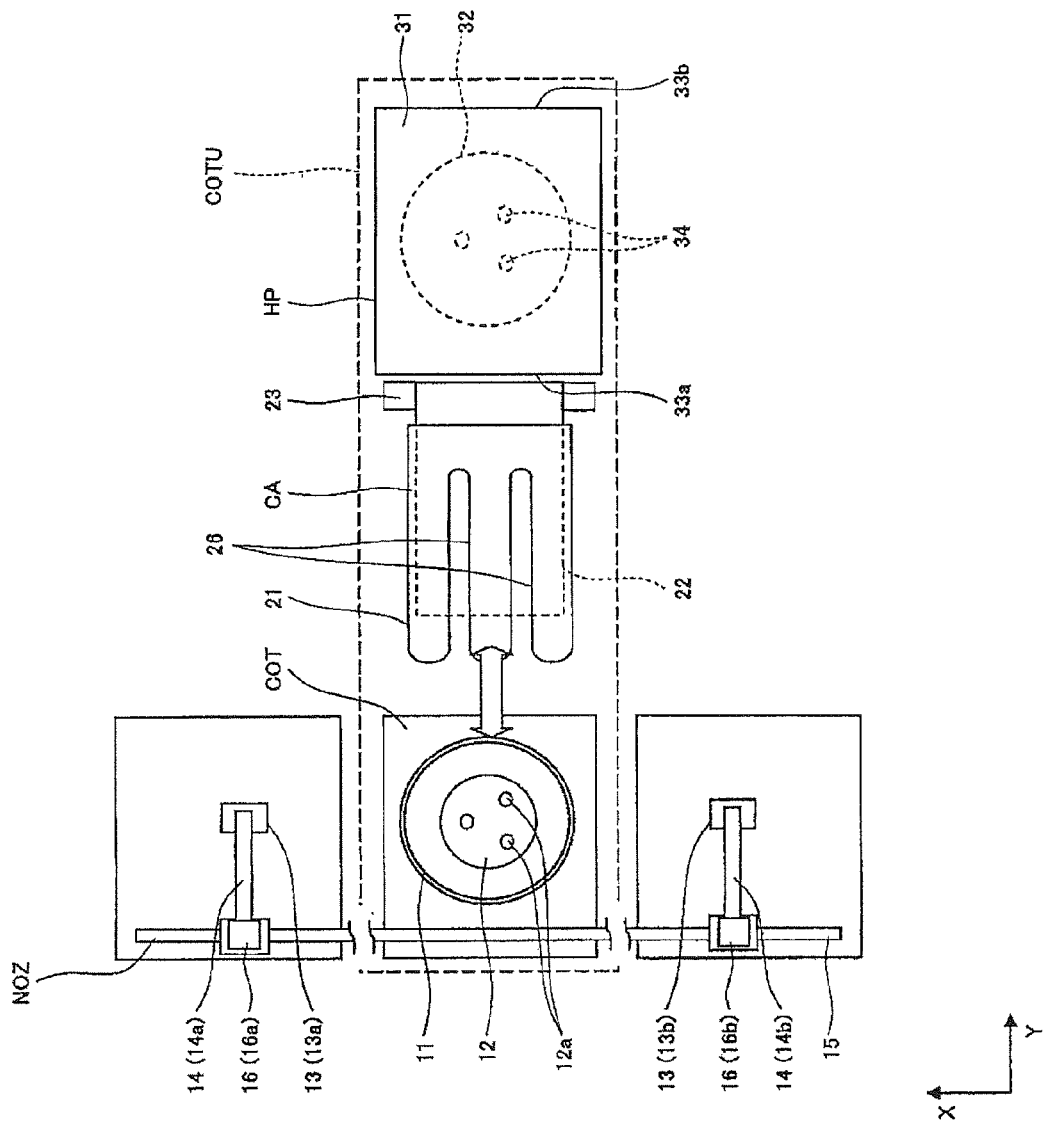
FIG. 3 is a schematic plan view illustrating the constitution of the coating process unit, according to an embodiment.
Figure 4:
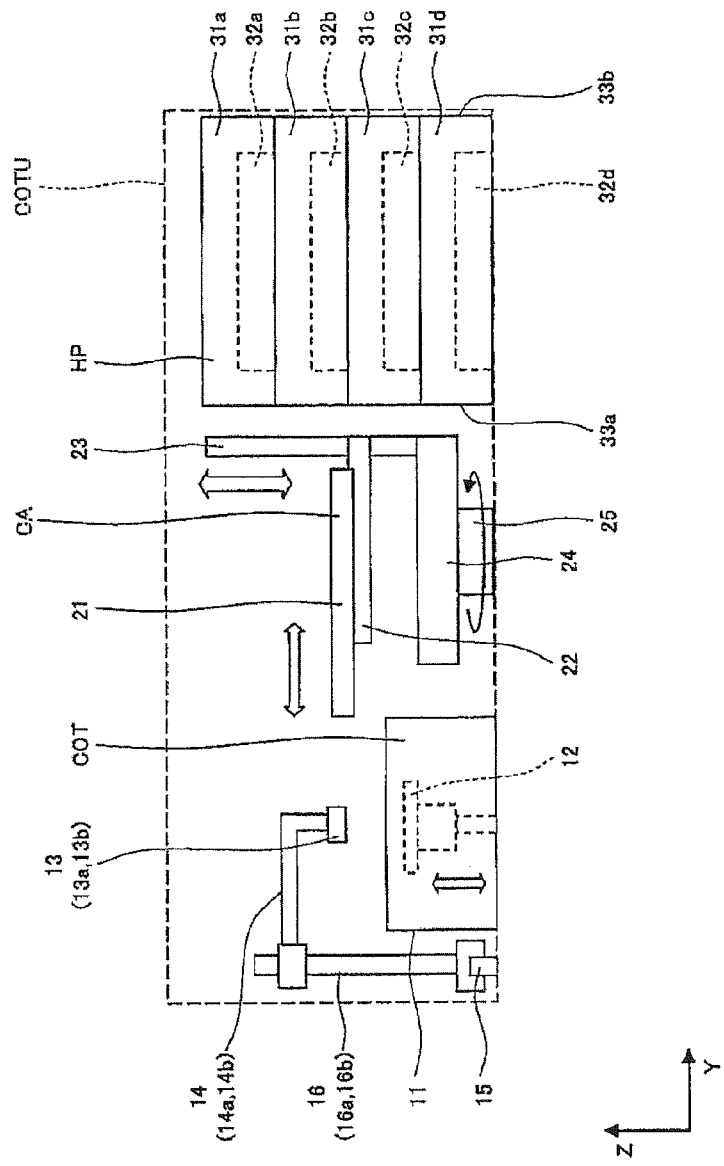
FIG. 4 is a schematic front view illustrating the constitution of the coating process unit, according to an embodiment.

Next, referring to FIGS. 3 and 4, the detailed constitution of the developing process unit including coating process part COT, cooling process part CA and heating process part HP, is described.

As described above, coating process unit COTU of the present embodiment includes coating process part COT, cooling process part CA and heating process part HP. Additionally, coating process unit COTU further includes chemical liquid supply part NOZ.

Coating process part COT includes a cup 11 and a spin chuck 12. Cup 11 is placed at the center part of coating process part COT and has a ring shape. Spin chuck 12 is placed inside cup 11, and driven by a rotation driving mechanism (not shown) formed with, for example, a motor while the wafer W is fixed by a vacuum absorption. Spin chuck 12 is driven with an up and down movement by an ascending driving mechanism such as an air cylinder (not shown). Also, spin chuck 12 includes a support pin 12a configured to be moveable in an up/down direction to transfer the wafer W.

Chemical liquid supply part NOZ includes nozzle 13 configured to supply a chemical liquid to the surface of the wafer W. Nozzle 13 is connected to a chemical liquid supply source (not shown) via a chemical liquid supply tube (not shown), and a chemical liquid is supplied from the chemical liquid supply source. Nozzle 13 is detachably attached to the front end of a nozzle scan arm 14 which is attached to the upper portion of a vertical support member 16 which is moveable in a horizontal direction along a guide rail 15 provided along a single direction (e.g., the X direction) on the bottom plate of coating process unit COTU. Nozzle 13 is also configured to be moveable along the Y direction integrally with vertical support member 16 by the driving mechanism of the Y direction (not shown).

On guide rail 15, multiple sets of nozzles 13, nozzle scan arm 14 and vertical support member 16 may be provided corresponding to the chemical liquids used for the processes such as resist, BARC, TARC (Top Anti-Reflective Coating), TC (Immersion Top Coat) and SOG (Spin On Glass). In the exemplary embodiment shown in FIG. 3, two sets are provided corresponding to two chemical liquids each associated with BARC and resist. Nozzle 13a, nozzle scan aim 14a and vertical support member 16a supply the chemical liquid of BARC (Bottom Anti-Reflective Coating), and nozzle 13b, nozzle scan arm 14b and vertical support member 16b supply the chemical liquid for the resist. Nozzles 13a, 13b are moveable along the X direction on guide rail 15, and any one of nozzles 13a, 13b may be selected and used at chemical liquid supply part NOZ.

Also, as described in the present embodiment, when a plurality of coating process units COTU are arranged in parallel, coating process part COT of different coating process unit COTU arranged in parallel in the X direction may share a single guide rail 15 and two nozzles 13a, 13b.

As illustrated in FIGS. 3 and 4, cooling plate CA includes cooling plate 21, slide mechanism 22, Z axis moving mechanism 23 and rotation mechanism 24. Further, cooling plate 21 is formed with an approximately tetragonal shape of a curved circular arc, as illustrated in FIGS. 3 and 4. A cooling tube (not shown) is embedded inside cooling plate 21 to flow the refrigerant, and the cooling plate 21 is maintained with a predetermined cooling temperature (e.g., 23° C.) by the cooling tube. Cooling plate 21 is configured to make an advance/retreat movement in the Y direction of the plane by slide mechanism 22, move to the Z direction by Z axis moving mechanism 23, and rotate around rotating shaft 25 by rotational mechanism 24.

Two slits 26 are provided in cooling plate 21, as illustrated in FIG. 3. Slit 26 is formed near the central portion of the edge of heating process part HP side to avoid a collision with support pin 12a when cooling plate 21 is moved on cup 11 of coating process part COT, or to avoid a collision with support pin 34 (which will be described later) when cooling plate 32 of heating process part HP is moved on a heating plate 32.

Heating process part HP includes four sets of heating process chamber 31 and heating plate 32. That is, heating process part HP includes heating process chambers 31a-31d and heating plates 32a-32d in an order from the top. Hereinafter, description will be made for one set of heating process part 31 and heating plate 32.

As illustrated in FIGS. 3 and 4, heating process chamber 31 surrounds the lower portion, upper portion and side portion of heating plate 32, and includes openings 33a, 33b at the two sides out of the side portions, that is, at cooling process part CA side and the opposite side thereof. As a result, heating plate 32 is accommodated inside of heating process chamber 31. Heating plate 32 is, for example, a disc shape with a thickness and a heater (not shown) is embedded therein. The temperature of heating plate 32 may be increased up to, for example, 130° C. by the heater.

Support pin 34 that can be ascended by an ascending mechanism (not shown) is provided to be penetrated and inserted near the central portion of heating plate 32. Using support pin 34, the wafer W can be ascended on heating plate 32, and the transferred between heating plate 32 and cooling plate 21.

Figure 5:
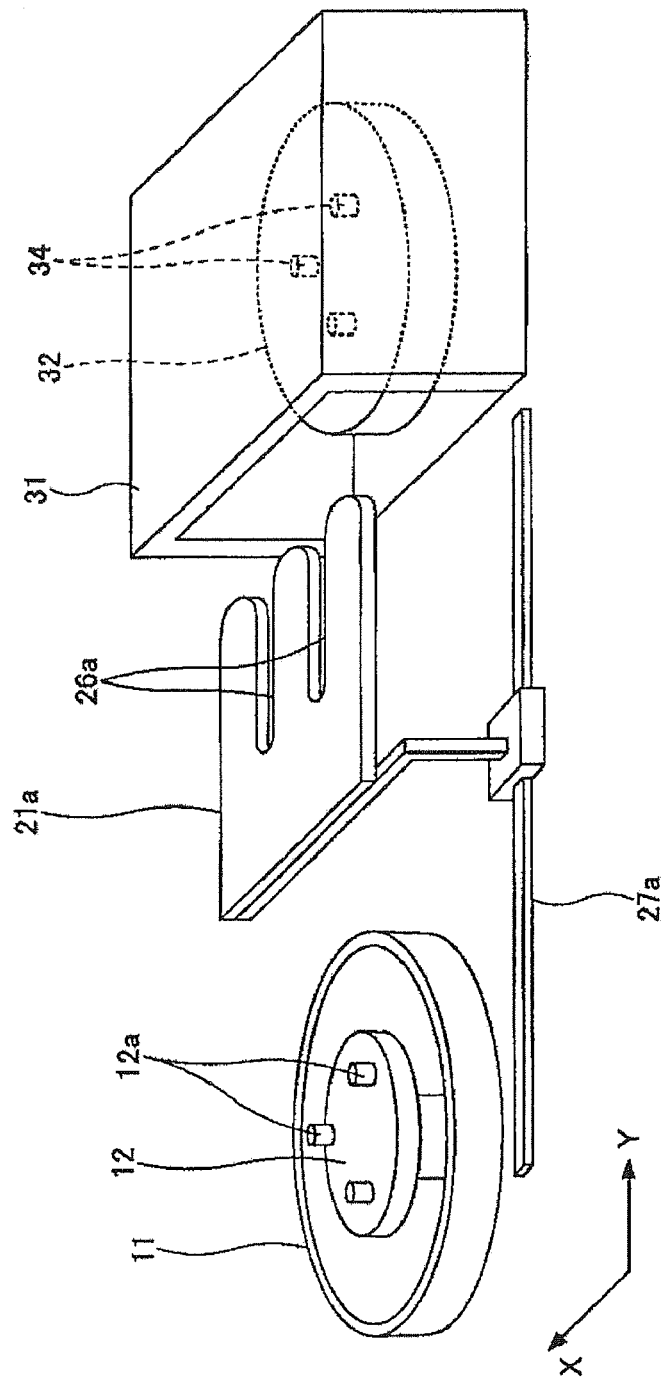
FIG. 5 is a perspective view illustrating the moving operation of the cooling plate of the cooling process part between the coating process part and the heat process part, according to the coating/developing apparatus of the present embodiment.
Figure 6:
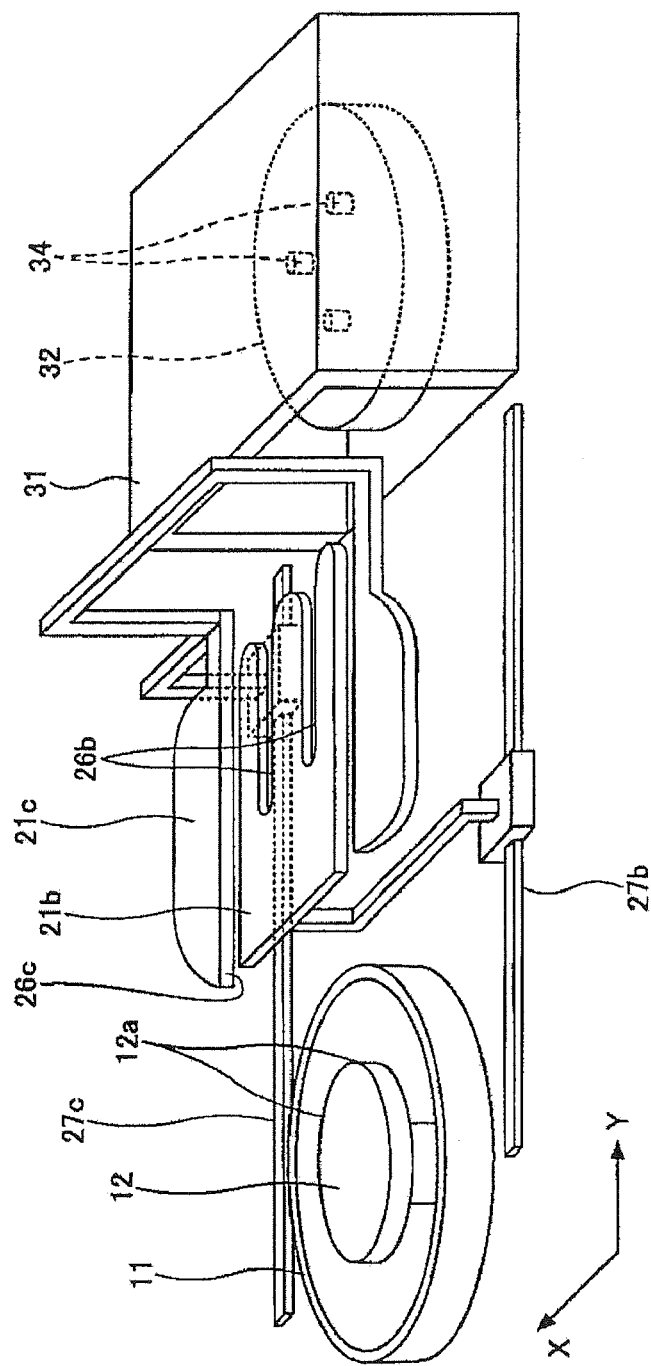
FIG. 6 is a perspective view illustrating the moving operation of the cooling plate of the cooling process part between the coating process part and the heat process part, according to the coating/developing apparatus of the present embodiment.

Referring to FIGS. 5 and 6, an exemplary operation will be described in which the cooling plate of the cooling process part of the coating/developing apparatus transfers the wafer to/from the coating process part and the heating process part.

In the exemplary embodiment shown in FIG. 5, for example, cooling plate 21a is provided to be moveable on guide rail 27a provided along the Y direction, and also moveable between the upper portion of cup 11 of coating process part COT and the upper portion of heating plate 32 of heating process part HP. Spin chuck 12 of coating process part COT includes support pin 12a configured to be moveable in an up/down direction, and transfers the wafer W by support pin 12a. Heating plate 32 of heating process part HP also includes support pin 34 similar to support pin 12a of coating process part COT.

The heating portion of cooling plate 21a is formed with an approximately tetragonal shape of the curved arc shape. A cooling tube (not shown) is embedded inside cooling plate 21a to flow the refrigerant, and the temperature of cooling plate 21a is maintained with a predetermined cooling temperature (e.g., 23° C.) by the cooling tube. As illustrated in FIG. 5, two slits 26a are formed in cooling plate 21a. Slit 26a is formed near the central portion from the edge of heating process part HP side of cooling plate 21a to avoid a collision with support pin 12a and support pin 34 when cooling plate 21a is moved to the upper portion of cup 11 of coating process part COT and to the upper portion of heating plate 32 of heating process part HP, respectively.

As illustrated in FIG. 5, for example, guide rail 27a is provided at the side portion along the Y direction of cooling plate 21a. Cooling plate 21a is configured to move on guide rail 27a, and move between the upper portion of cup 11 of coating process part COT and the upper portion of heating plate 32 of heating process part HP.

In the meantime, cooling plate 21b and support plate 21c are provided in the exemplary embodiment shown in FIG. 6. Cooling plate 21b is configured to be moveable on the first guide rail 27b provided along the Y direction, and also configured to make an advance/retreat movement toward the upper portion of cup 11 of coating process part COT. Heating plate 32 of heating process part HP includes support pin 34 configured to be moveable in an up/down direction, and transfers the wafer W between cooling plate 21b by support pin 34. Spin chuck 12 of coating process part COT is provided to be moveable in an up/down direction and transfers the wafer W between support plate 21c.

Cooling plate 21b has a substantially similar structure to cooling plate 21a as shown in FIG. 5 except that the width in the X direction becomes smaller, includes an embedded cooling tube therein (not shown), and is provided with slit 26b to avoid a collision with support pin 34 of heating plate 32. Support pin 21c is structured such that cooling plate 21b is placed in between the both sides of the X direction. As a result, a wide slit 26c is formed in support plate 21c, as illustrated in FIG. 6. Slit 26c is formed to avoid a collision with spin chuck 12 that is moving in an up/down direction when support pin 21c is moved to the upper side of cup 11 of coating process part COT. Support pin 21c includes a driving mechanism (not shown) configured to move in an up/down direction, and transfers the wafer W between cooling plate 21b by changing the height with respect to cooling plate 21b. Also, while cooling plate 21c transfers the wafer W between coating process part COT, a cooling tube may be embedded therein.

Hereinafter, descriptions will be made for a coating process method in the coating/developing apparatus, according to the present embodiment.

The coating process method according to the present embodiment corresponds to the coating/developing method of the present disclosure. Coating process method includes transferring the substrate carried in to carrier block B1 by a carrier [cassette C] to processing means [coating process part COT, cooling process part CA and heating process part HP], forming a coating layer including a resist at the processing means, transferring the substrate to an exposure apparatus via interface block B6, developing the exposed substrate returned via interface block B6 at the processing means [developing process part DEV, cooling process part CA and heating process part HP], and transferring the developed substrate to carrier block B1.

Figure 7:
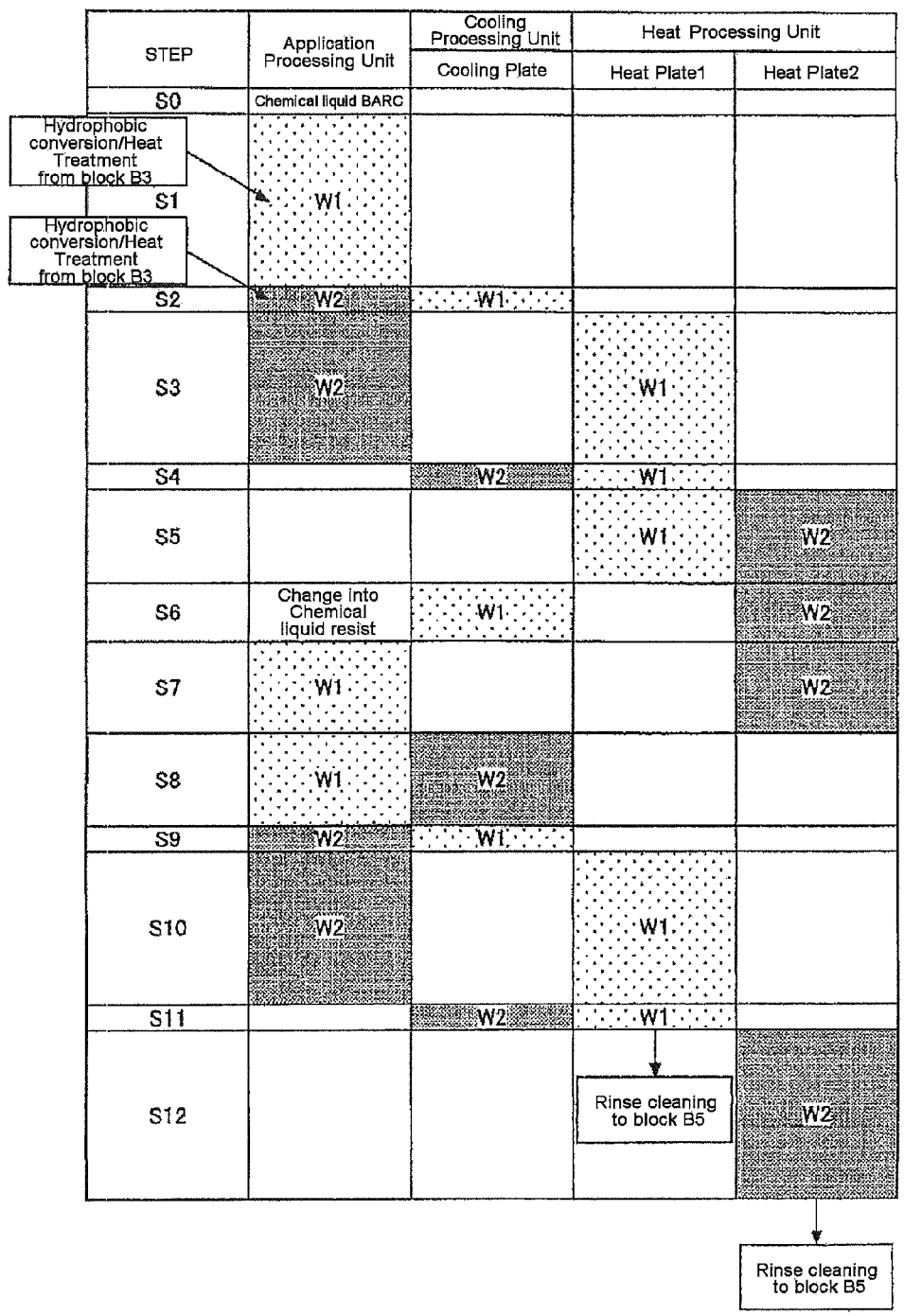
FIG. 7 is a time chart illustrating the wafer processing states in each of the units and parts when the coating/developing apparatus performs the coating/developing method as an exemplary embodiment.

In the time chart shown in FIG. 7, step number, the wafer W number supported by spin chuck 12 of coating process part COT, the wafer W number supported by cooling plate 21 of cooling process part CA, the wafer W number supported by heating plates 32a, 32b of heating process part HP are indicated sequentially from the left column. Also, the length of the longitudinal direction at each step of FIG. 7 represents the trend of the processing time in each step. However, the length of the longitudinal direction in each step of FIG. 7 represents the trend of the processing time in a rough diagram, but not the precise data.

Steps S1 through S12 illustrate a series of continuous processes of BARC coating process→heating process (pre-baking)→cooling process→resist coating process→heating process (pre-baking) for two wafers W1, W2.

Also, prior to begin with step S1, step S0 is performed where the nozzle of chemical liquid supply part NOZ is replaced with the nozzle for BARC chemical liquid.

At step S1, the wafer W1 is transferred from cooling process unit COL of hydrophobic conversion/cooling process block B3 to spin chuck 12 of coating process part COT, and the BARC coating process begins.

The wafer W1 is transferred from cooling process unit COL to wafer transfer arm 4a of hydrophobic conversion/ cooling process block B3. Next, the X direction position and Z direction height of wafer transfer arm 4a are adjusted and transfer arm 4a is moved to the +Y direction so that transfer arm 4a is introduced to the upper side of cup 11 of coating process part COT. Next, support pin 12a of coating process part COT is ascended to transfer the wafer W1 from wafer transfer arm 4a to support pin 12a. Subsequently, wafer transfer arm 4a is moved to the −Y direction to retreat to the upper side of cup 11. Support pin 12a is then descended to transfer the wafer W1 from support pin 12a to spin chuck 12. The wafer W1 is then rotated while BARC chemical liquid is supplied to the surface of the wafer W1 by the nozzle for BARC chemical liquid thereby coating the BARC. As for the conditions for the coating process, for example, the rotating speed is 3000 rpm and processing time is 60 seconds.

At step 2, the wafer W1 completed with the coating process is transferred from spin chuck 12 of coating process part COT to cooling plate 21 of cooling process part CA. The wafer W2 is then transferred from cooling process unit COL of hydrophobic conversion/cooling process block B3 to spin chuck 12 of coating process part COT to begin the BARC coating process.

The wafer W1 is transferred from spin chuck 12 to support pin 12a by ascending support pin 12a of coating process part COT. Cooling plate 21 is then moved to the −Y direction and introduced to the upper portion of cup 11 of coating process part COT. Next, cooling plate 21 is moved to the +Y direction while the wafer W1 is maintained to retreat from the upper portion of cup 11. The BARC coating process for the wafer W2 is similar to the BARC coating process for the wafer W1 at step S1. That is, while the wafer W2 is maintained by spin chuck 12 of coating process unit COT, and rotated, the BARC chemical liquid is supplied to the surface of the wafer W2 by the nozzle for the BARC chemical liquid thereby coating the BARC. The coating process conditions are similar to the conditions for the wafer W1.

At step S3, the wafer W1 is transferred from cooling plate 21 of cooling process part CA to heating plate 32a (heating plate 1) of heating process part HP to begin the heating process, and the wafer W2 is continuously processed for coating process. Cooling plate 21, after the height of the Z direction is adjusted and moved into the +Y direction to maintain the wafer W1, is introduced to the upper portion of heating plate 32a of heating process part HP. Next, the wafer W1 is transferred from cooling plate 21 to support pin 34 by ascending support pin 34 of heating plate 32a. Subsequently, cooling plate 21 is moved to −Y direction and retreated from the upper portion of heating plate 32a. Next, the wafer W1 is transferred from support pin 34 to heating plate 32a by descending support pin 34 and the heating process begins. As the conditions for the heating process, the processing temperature is 200° C., and the processing time is 90 seconds, for example.

At step S4, the wafer W1 is continuously processed for the heating process, and the wafer W2 for which the coating process is completed is transferred from spin chuck 12 of coating process part COT to cooling plate 21 of cooling process part CA. The transfer operation of the wafer W2 from spin chuck 12 to cooling plate 21 is similar to the transfer operation of the wafer W1 from spin chuck 12 to cooling plate 21 at step S2.

At step S5, the wafer W1 is continuously processed for the heating process, and the wafer W2 is transferred from cooling plate 21 of cooling process part CA to heating plate 32b (heating plate 2) of heating process part HP to being the heating process. The transfer operation of the wafer W2 from cooling plate 21 to heating plate 32b is similar to the transfer operation of the wafer W1 from cooling plate 21 to heating plate 32a at step S3, except that the heating plate is heating plate 32b.

At step S6, the wafer W1 for which the heating process is completed is transferred from heating plate 32a of heating process part HP to cooling plate 21 of cooling process part CA, and the wafer W2 is continuously processed by the heating process. The wafer W1 is transferred from heating plate 32a to support pin 34 by ascending support pin 34 of heating plate 32a. Subsequently, cooling plate 21, after adjusting the height of the Z direction and moved into the +Y direction, is introduced to the upper portion of heating plate 32a of heating process part HP. Next, the wafer W1 is transferred from support pin 34 to heating plate 21 by descending support pin 34, and cooling plate 21 is moved to the −Y direction to retreat from the upper portion of heating plate 32a.

Furthermore, at step S6, BARC chemical liquid nozzle is retreated from the upper portion of cup 11 and resist chemical liquid nozzle is introduced to the upper portion of cup 11, thereby changing the nozzle of the chemical liquid supply part NOZ from the chemical liquid nozzle to the resist chemical liquid nozzle.

At step S7, the wafer W1 for which the cooling process is completed is transferred from cooling plate 21 of cooling process part CA to spin chuck 12 of coating process part COT, and the wafer W2 is continuously processed for the heating process. Subsequently, cooling plate 21, after adjusting the height of the Z direction and moved into the −Y direction to maintain the wafer W1, is introduced to the upper portion of cup 11 of coating process part COT. Next, the wafer W1 is transferred from cooling plate 21 to support pin 12a by ascending support pin 12 of spin chuck 12. Next, cooling plate 1 is moved to the +Y direction, and is retreated from the upper portion of cup 11. The wafer W1 is then transferred support pin 12a to spin chuck 12 by descending support pin 12a.

While the wafer W1 is maintained by spin chuck 12 of coating process part COT and rotated, the resist is applied by supplying the resist chemical liquid to the surface of the wafer W1 via the nozzle for the resist chemical liquid. The conditions for the coating process condition include a rotating speed of 3000 rpm and a processing time of 60 seconds.

At step S8, the wafer W1 is continuously processed for the coating process, and the wafer W2 for which the heating process is completed is transferred from heating plate 32b of heating process part HP to cooling plate 21 of cooling process part CA. The transfer operation of the wafer W2 from heating plate 32b to cooling plate 21 is similar to the transfer operation of the wafer W1 from heating plate 32a to cooling plate 21, except that the heating plate is heating plate 32b.

At step S9, the wafer W1 for which the coating process is completed is transferred from spin chuck 12 of coating process part COT to cooling plate 21 of cooling process CA, and the wafer W2 for which the cooling process is completed is transferred from cooling plate 21 of cooling process part CA to spin chuck 12 of coating process part COT. To perform the processes of step S9, for example, two cooling plates may be provided at cooling process part CA, and the wafer W1 may be transferred from spin chuck 12 to the one side of the cooling plate and the wafer W2 may be received from the other cooling plate. The transfer method between the cooling plate and spin chuck 12 is similar to the method in each process described above.

At step S10, the wafer W1 is transferred from cooling plate 21 of cooling process part CA to heating plate 32a of heating process part HP to begin the heating process, and the wafer W2 is continuously processed for the coating process. The process of step S10 is similar to the process of step S3 except that the coating process time of wafer W1 and the heating process time of the wafer W2 are different since the chemical liquid is resist. As for the heating process conditions, for example, the processing temperature is 120° C. and the processing time is 60 seconds.

At step S11, the wafer W1 is continuously processed for the heating process, and the wafer W2 for which the coating process is completed is transferred from spin chuck 12 of coating process part COT to cooling plate 21 of cooling process part CA. The process for step S11 is also similar to the process of step S4 except that the chemical liquid is resist.

At step S12, the wafer W1 for which the heating process is completed is transferred from heating plate 32a of heating process part HP to periphery exposure apparatus WEE of rinse cleaning block B5, and the wafer W2 is transferred from cooling plate 21 of cooling process part CA to heating plate 32b of heating process part HP to begin the heating process.

The wafer W1 is transferred from heating plate 32a to support pin 34 by ascending support pin 34 of heating plate 32a. Subsequently, wafer transfer arm 5a of rinse cleaning block B5, after adjusting the position of the X direction and the height of the Z direction, is moved to the −Y direction to introduce the upper portion of heating plate 32a. Next, the wafer W1 is transferred from support pin 34 to wafer transfer arm 5a by descending support pin 34. Wafer transfer arm 5a is then moved to the +Y direction and retreated from the upper portion of heating plate 32a. The wafer W1 is then transferred to periphery exposure apparatus by wafer transfer arm 5a to perform the periphery exposure.

The transfer operation of the wafer W2 from cooling plate 21 to heating plate 32b and the beginning of the heating process are similar to the processes at step S5.

Upon completing step S12, at step S13, the wafer W2 for which the heating process is completed is transferred from heating plate 32b of heating process part HP to periphery exposure apparatus WEE of rinse cleaning block B5. The transfer operation of the wafer W2 to periphery exposure apparatus WEE is similar to the transfer operation of the wafer W1 to periphery exposure apparatus WEE at step S12.

Also, the timings as described above represent a case where the BARC coating process is consecutively performed for two wafers, and resist coating process is performed for the two wafers. However, if multiple heating plates are provided and the processing capability is sufficient, the BARC coating process may be performed for three wafers consecutively, and the resist coating process may be performed for the three wafers. Also, since the temperatures between the heating process for the BARC and resist are different, the number of heating plates may be doubled to four heating plates. In this case, the temperature control for the heating plates is not necessary during the process thereby improving the number of processed wafers per unit time may be increased.

Alternatively, when the relationship between the coating process time, heating process time and cooling process time is adjusted, the BARC coating process and resist coating process may be continuously performed for a wafer, and then the BARC coating process and the resist coating process for another wafer may be performed continuously.

According to the coating/developing apparatus of the present embodiment, multiple coating process units each including coating process part COT, cooling process part CA and heating process part are arranged in a plural planes or overlapped in an up/down direction in parallel. As a result, a series of liquid processing including a forward direction process (e.g., coating process→p cooling process→heating process) and a reverse direction process (e.g., heating process→cooling process→coating process) may be performed in parallel (e.g., a multi process). In the exemplary timing chart shown in FIG. 7, assuming that the processing capability in coating process part COT is a bottle neck and the coating processing time is 60 seconds, the number of processed wafers per hour is 60 wph in a set of coating process unit COTU. Accordingly, as illustrated in FIGS. 1 and 2, if six sets of coating process units are provided, the maximum capability would be 60×6=360 wph.

In the meantime, in a conventional coating/developing apparatus, the coating process part, the cooling process part and the heating process part are not provided correspondingly by 1:1 relationship, and the wafer transfer arm is not provided corresponding to the coating process part by 1:1 relationship. As a result, a parallel processing (e.g., a multi processing) may not be performed in the conventional coating/developing apparatus, and the size of the apparatus may not be readily reduced even if six sets of coating process part, cooling process part and heating process part are provided, because a plurality of wafer transfer arms are necessary.

Also, according to the coating/developing apparatus of the present embodiment, when any one of coating processing part COT, cooling process part CA and heating process part HP of one of coating process units COTU has a problem and the process thereof is halted, the processes of another coating process unit COTU can be continued. Accordingly, the process time per wafer can be reduced.

Also, the above described constitution can be similar to developing process units DEVU1~DEVU3. That is, developing process units DEVU1~DEVU3 have similar constitution to coating process units COTU1~COTU3, and the discharged chemical liquid is a developing liquid. Accordingly, in the coating/developing apparatus of the present embodiment, multiple developing process units each including developing process part DEV, cooling process part CA and heating process part HP consecutively are arranged in multiple planes or to be overlapped in an up/down direction in parallel, a series of liquid processing including heating process (baking process after an exposure process)→cooling process→developing process can be performed in parallel (e.g., a multi processing). As a result, when any one of developing process part DEV, cooling process part CA and heating process part HP of one of developing process units DEVU has a problem and the process thereof is halted, the processes of another developing process unit DEVU can be continued. Accordingly, the process time per wafer can be reduced.

Modified Embodiment

Figure 8:
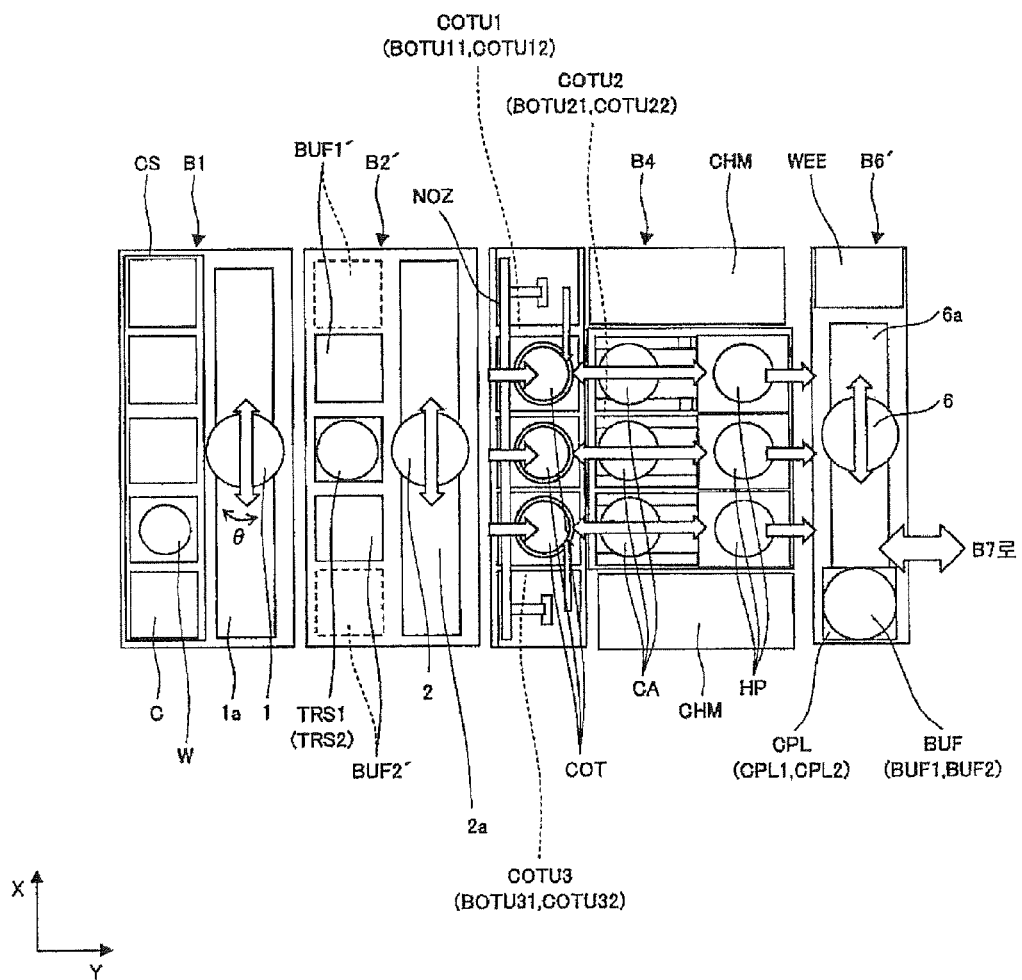
FIG. 8 is a schematic plan view illustrating the constitution of the coating/developing apparatus, according to an alternative embodiment.
Figure 9:
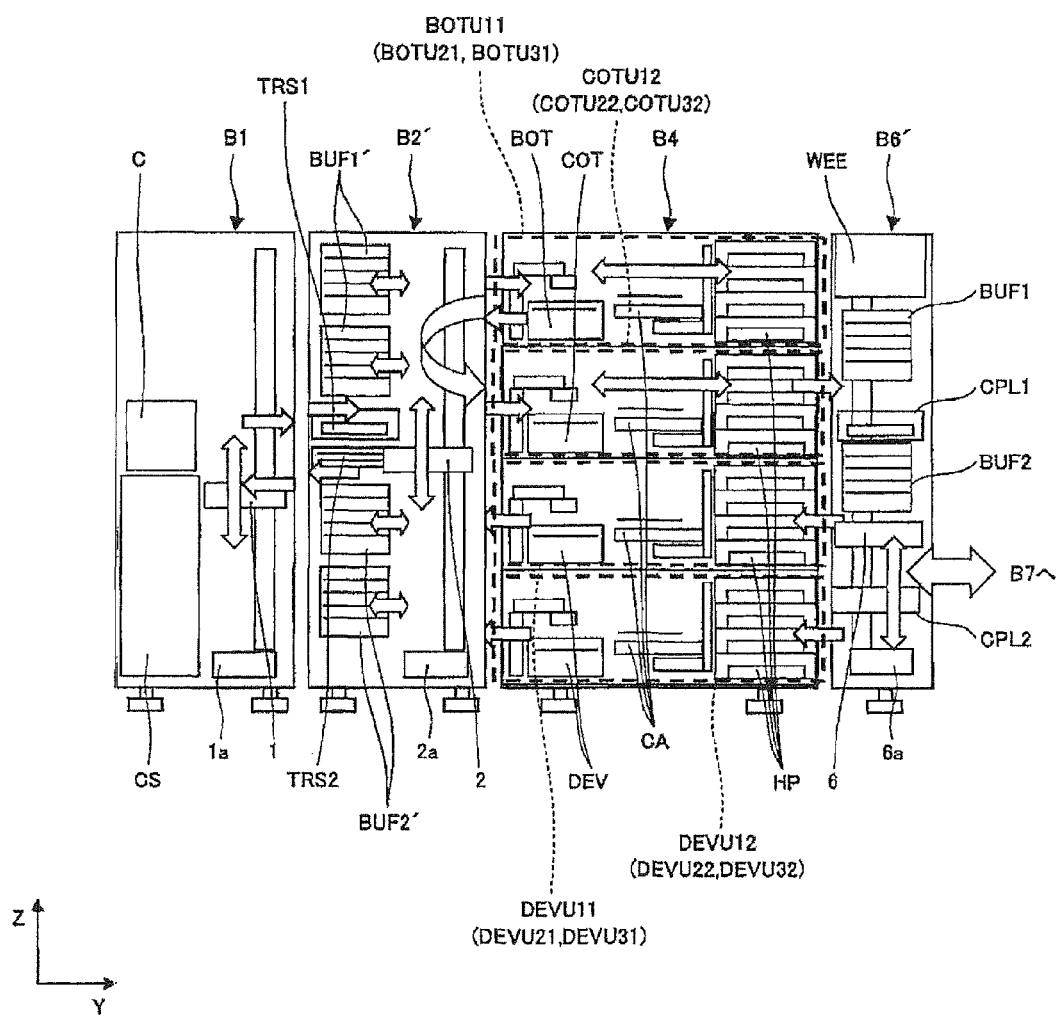
FIG. 9 is a schematic front view illustrating the constitution of the coating/developing apparatus, according to an alternative embodiment.

Referring to FIGS. 8 and 9, descriptions will be made for a modified embodiment of the coating/developing apparatus.

The coating/developing apparatus according to the modified embodiment differs from the above described embodiment in that hydrophobic conversion/heating process block and rinse cleaning block are not provided.

In the modified embodiment as well, coating/developing apparatus includes carrier block B1 and descriptions thereof will be omitted since the constitution is similar to the above described embodiment. Also, in the descriptions below, same numerals are used for the elements described earlier and descriptions may be omitted from time to time.

In the modified embodiment, coating/developing process block B4 includes, for example, coating process units COTU1~COTU3 and developing process units DEVU1~DEVU3. Coating process unit and developing process unit are provided in an up/down direction with two layers, and, the coating process unit may be provided in the upper layer and the developing process unit may be provided in the lower layer, as an example.

Coating process unit COTU1 is formed with, for example, coating process units BOTU11, COTU12. Likewise, each of coating process units COTU2, COTU3 is formed with a set of coating process units BOTU21, COTU22 and a set of coating process units BOTU31, COTU32, respectively, arranged to be overlapped with each other in an up/down direction with two layers.

In the present modified embodiment, the kinds of chemical liquids in each coating process unit may be provided individually in each of the two layers. In this case, as illustrated in FIGS. 8 and 9, the BARC chemical liquid may be provided for the upper process units BOTU11, BOTU21, BOTU31, and resist chemical liquid may be provided for the lower process units COTU12, COTU22, COTU32. Also, the upper process units BOTU11, BOTU21, BOTU31 are called BARC coating process unit, and the lower process units COTU12, COTU22, COTU32 are called resist coating process unit.

The constitution of coating process units BOTU11~COTU32 is similar to the embodiment described above except that the kinds of chemical liquids is different in the two upper/lower layers. That is, resist coating process units COTU12, COTU22, COTU32 have similar structure to the embodiment described above. Also, BARC coating process units BOTU11, BOTU21, BOTU31 have similar structure to the embodiment described above except that coating process unit is represented as BOT instead of COT.

Developing process unit DEVU1 has similar structure to the embodiment described above, and formed with, for example, developing process units DEVU11, DEVU12 arranged to be overlapped in an up/down direction with two layers. Likewise, developing process units DEVU2, DEVU3 are also formed with a set of developing process units DEVU21, DEVU22 and a set of developing process units DEVU31, DEVU32, arranged to be overlapped in an up/down direction with two layers.

In the modified embodiment, a buffer block B2' is provided instead of test block B2 and hydrophobic conversion/heating process block B3. Also, instead of rinse cleaning block B5 and interface block B6 provided in the embodiment described above, periphery exposure/interface block B6' are provided in the modified embodiment.

Buffer block B2' is arranged in parallel along the X direction in the plane, and includes a buffer unit and wafer transfer arm 2 arranged to be overlapped in an up/down direction of the Z direction.

Two transfer units TRS1, TRS2 are provided to be overlapped in an up/down direction, and transfers the wafer W between transfer arm 1 of carrier block B1.

Buffer unit is formed with, for example, buffer units BUF1', BUF2' provided to be overlapped in an up/down direction. Upper buffer unit BUF1' receives the wafer W transferred from carrier block B1 to BARC coating process unit BOTU, or the wafer W that is returned from BARC coating process unit BOTU for the moment and re-transferred to coating process unit COTU. Lower buffer unit BUF2' receives the wafer W transferred from developing process unit DEVU to carrier block B1.

Wafer transfer arm 2 is provided to be moveable along the X direction on transfer path 2a. Wafer transfer arm 2 is also moveable along the direction where the wafer W accommodated at transfer unit TRS1, TRS2 are arranged (e.g., Z direction; vertical direction), and constituted to selectively access the wafer W inside transfer unit TRS1, TRS2 provided to be overlapped in an up/down direction. Wafer transfer arm 2 transfers the wafer W to/from transfer unit TRS1, TRS2, buffer unit BUF1', BUF2', coating process units COTU1~COTU3 and developing process units DEVU1~DEVU3 of coating/developing process block B4.

Periphery exposure/interface block B6' includes periphery exposure apparatus WEE, wafer transfer arm 6, buffer unit BUF, and cooling process unit CPL.

Periphery exposure apparatus WEE performs a periphery exposure to remove the resist in unnecessary portions of wafer periphery. Wafer transfer arm 6 is configured to be moveable along the X direction on transfer path 6a. Wafer transfer arm 6 is also moveable along the Z direction, and configured to selectively access the wafer W inside buffer units BUF1, BUF2 of periphery exposure/interface block B6'. Wafer transfer arm 6 transfers the wafer from buffer unit BUF1 to exposure apparatus B7 (not shown), and transfers the exposed wafer W from exposure apparatus B7 to buffer unit BUF2 which will be described below.

Buffer unit BUF is formed with, for example, buffer units BUF1, BUF2 arranged to be overlapped in the upper and lower ends. Upper end buffer unit BUF1 is an in-buffer unit that receives the wafer W carried in to exposure apparatus B7 (not shown) for a moment. Lower end buffer unit BUF2 is an out-buffer unit that receives the wafer W carried out from exposure apparatus B7. Also, each of buffer units BUF1, BUF2 is provided with cooling process units CPL1, CPL2 to be overlapped in an up/down direction.

Hereinafter, descriptions will be made for the flow of the wafer W in the coating/developing apparatus according to the modified embodiment. Cassette C is placed on cassette arrangement plate CS from outside, and the wafer W is taken out from cassette C by wafer transfer arm 1. The wafer W is then transferred to transfer unit TRS1 via wafer transfer arm 1, passes buffer unit BUFF and then transferred to BARC coating process unit BOTU11 of an upper portion of coating process unit COTU via wafer transfer arm 2. Upon completing the sequential processes at coating process part BOT, cooling process part CA and heating process part HP inside BARC coating process unit BOTU11, wafer transfer arm 2 transfers the wafer W from upper end BARC coating process unit BOTU11 to lower end resist coating process unit COTU12 via buffer unit BUFF. After completing the processes in each of coating process part COT, cooling process part CA, and heating process part HP inside resist coating process unit COTU12, wafer transfer arm 6 transfers the wafer W to cooling unit CPL1 where the cooling process is performed. After completing the cooling process, the wafer W is transferred to periphery exposure apparatus WEE by wafer transfer arm 6 and the periphery exposure is performed. After completing the periphery exposure, the wafer W is transferred to exposure apparatus B7 by wafer transfer arm 6 and an exposure process is performed.

The wafer W for which the exposure process is performed is transferred to developing process unit DEVU by wafer transfer arm 6. After completing the processes in each of coating process part COT, cooling process part CA, and heating process part HP inside developing process unit DEVU, the wafer W is transferred to transfer unit TRS2 via buffer unit BUF2' by wafer transfer arm 2, and then returned to cassette C by wafer transfer arm 1.

Among the flow of the wafer W described above, each of the processes at BARC coating process unit BOTU11, resist coating process unit COTU12 and developing process unit DEVU may be performed in parallel by using multiple BARC coating process units BOTU, multiple resist coating process units COTU and multiple developing process units DEVU.

In the coating/developing apparatus of the modified embodiment as well, when any one of coating process units COTU has a problem and the operation thereof is halted, another coating process unit COTU can continue to process. Also, when any one of developing process units DEVU has a problem and the operation thereof is halted, another developing process unit DEVU can continue to process. As a result, the processing time per wafer can be reduced compared to the conventional coating/developing apparatus.

While exemplary embodiments of the present disclosure have been described above, the present disclosure is not limited to the specific embodiments and may be modified and changed within the scope of the present disclosure represented in the claims.

Also, the present disclosure may be applied not only to the coating/developing apparatus, but also to the substrate cleaning apparatus, film forming apparatus, etching apparatus and other various apparatuses. The present disclosure may also be applied to the apparatus that includes a transfer processing of a substrate such as the semiconductor substrate, the glass substrate and other various substrates.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A coating and developing apparatus comprising:
    a carrier block configured to receive a substrate carried by a carrier;
    a coating and developing block configured to coat a resist layer on the substrate transferred from the carrier block and develop the resist layer after an exposure of the resist layer: and
    an interface block configured to transfer the substrate between the coating and developing block and an exposure apparatus,
    wherein the coating and developing block further comprising:
        a coating unit configured to coat the resist layer on the substrate transferred to the coating and developing block from the carrier block, the coating unit includes a coating part configured to coat the resist layer on the substrate and a first heating part corresponding to the coating part configured to heat the substrate coated with the resist layer, and
        a developing unit stacked on or below the coating unit and configured to develop the substrate exposed at the exposing apparatus after the substrate is returned from the exposure apparatus, the developing unit includes a second heating part configured to heat the substrate, a cooling part provided adjacent to the second heating part, and a developing part provided corresponding to the cooling part,
        wherein the coating part and the first heating part are arranged in a straight line,
            the second heating part, the cooling part and the developing part are arranged in a straight line sequentially, and
            the cooling part transfers the substrate from the second heating part to the developing part while cooling the substrate to a predetermined temperature.

2. The coating and developing apparatus of claim 1, wherein the coating unit is further configured to transfer the substrate received from the carrier block sequentially into the coating part and the first heating part arranged in the straight line, and take out the substrate from an opposite side to the carrier block.

3. The coating and developing apparatus of claim 1, wherein the developing unit is further configured to transfer the substrate received from an opposite side to the carrier block sequentially into the second heating part, the cooling process part and the developing process part arranged in the straight line, and transfer the substrate into the carrier block.

4. The coating and developing apparatus of claim 1, wherein each of the coating unit and the developing unit is plurally arranged in parallel within the same plane.

5. The coating and developing apparatus of claim 4, wherein the plurality of the coating units and the plurality of the developing unit are arranged by overlapping with an up and down direction.

6. The coating and developing apparatus of claim 1, wherein each of the first heating part and the second heating part includes a plurality of heating plates configured to hold and heat the substrate, and the plurality of heating plates are placed by overlapping with an up and down direction.

7. The coating and developing apparatus of claim 1, wherein the cooling part includes a cooling plate configured to hold and cool the substrate, and the cooling plate is configured to transfer the substrate between the second heating part and the developing part.

8. The coating and developing apparatus of claim 1, wherein the cooling part includes a cooling plate configured to hold and cool the substrate and a holding plate configured to hold the substrate, the cooling plate is configured to transfer the substrate to and from the second heating process part, and the holding plate is configured to transfer the substrate to and from the developing part.

9. The coating and developing apparatus of claim 1, further comprising:
    a carry-in and carry-out unit configured to carry the substrate in/out from the coating unit and the developing unit; and
    a first buffer unit provided at a side of the carry-in and carry-out unit of the coating unit and the developing unit, and configured to transfer the substrate between the coating unit and the developing unit.

10. The coating and developing apparatus of claim 1, further comprising a second buffer unit provided at an opposite side of the carry-in and carry-out unit of the coating unit and the developing unit, and configured to transfer the substrate between the coating unit and the developing unit.

11. A coating and developing method performed by utilizing a coating and developing apparatus which includes a carrier block configured to receive a substrate carried by a carrier, a coating and developing block configured to coat a resist layer and develop the resist layer after an exposure of the resist layer, and an interface block configured to transfer the substrate between the coating and developing block and an exposure apparatus, the method comprising:
    coating the resist layer on the substrate transferred from the carrier block to a coating unit of the coating and developing block, the coating step includes a first liquid process to form the resist layer on the substrate using a chemical liquid at a coating part and a first heating process to heat the substrate coated with the resist layer at a first heating part provided corresponding to the coating part; and
    developing the substrate coated with the resist layer and exposed at the exposing apparatus by a developing unit stacked on the coating unit after the substrate is returned from the interface block to the developing unit, the developing step includes a second heating process performed at a second heating part to heat the substrate, a cooling process to cool the substrate at a cooling part provided adjacent to the second heating part, and a second liquid process performed at a developing part provided corresponding and adjacent to the cooling part to develop the substrate cooled at the cooling process using a chemical liquid,
    wherein the coating part and the first heating part are arranged in a straight line,
        the second heating part, the cooling part and the developing part are arranged in a straight line sequentially, and
        the substrate is transferred from the second heating part to the developing part during the cooling process.

12. The coating and developing method of claim 11, wherein the coating process includes sequentially carrying the substrate received from the carrier block into the coating part and the first heating part arranged in the straight line.

13. The coating and developing method of claim 11, wherein the developing includes carrying the substrate received in an opposite side to the carrier block sequentially into the second heating part, the cooling part and the developing part arranged in the straight line and carries the substrate into the carrier block.

* * * * *